US012737646B2

(12) United States Patent
Schell et al.

(10) Patent No.: US 12,737,646 B2
(45) Date of Patent: Sep. 15, 2026

(54) TIERED ANOMALY DETECTION

(71) Applicant: ServiceNow, Inc., Santa Clara, CA (US)

(72) Inventors: Lorne Schell, Montreal (CA); Fanny C. Riols, Montreal (CA); Stenio F. L. Fernandes, Ottawa (CA); Pegah Kamousi, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 655 days.

(21) Appl. No.: 18/203,554

(22) Filed: May 30, 2023

(65) Prior Publication Data

US 2024/0403662 A1 Dec. 5, 2024

(51) Int. Cl.

| | |
|---|---|
| ***G06N 20/20*** | (2019.01) |
| ***G06N 5/022*** | (2023.01) |
| ***G06N 20/00*** | (2019.01) |

(52) U.S. Cl.

CPC ............. *G06N 5/022* (2013.01); *G06N 20/00* (2019.01)

(58) Field of Classification Search

CPC ............................... G06N 20/00; G06N 20/20

See application file for complete search history.

(56) References Cited

U.S. PATENT DOCUMENTS

| | | | | |
|---|---|---|---|---|
| 2022/0172100 | A1 * | 6/2022 | Balasubramanian | G06T 7/0008 |
| 2022/0277397 | A1 * | 9/2022 | Doyle | G06Q 40/08 |
| 2023/0008225 | A1 * | 1/2023 | Mandal | G06F 30/20 |
| 2023/0027353 | A1 * | 1/2023 | Alizadeh | C12Q 1/6886 |

* cited by examiner

*Primary Examiner* — Grace Park

(74) *Attorney, Agent, or Firm* — McDonnell Boehnen Hulbert & Berghoff LLP

(57) ABSTRACT

For each corresponding configuration item type of a plurality of different configuration item types, a corresponding multi-variate machine learning model of a plurality of multi-variate machine learning models is trained to perform anomaly detection for a corresponding configuration item type of the plurality of different configuration item types. In response to detecting, via a univariate machine learning model, an anomaly associated with a specific configuration item type of the plurality of different configuration item types, an execution of a particular multi-variate machine learning model of the plurality of multi-variate machine learning models is initiated for the specific configuration item type. An output of the execution of the particular multi-variate machine learning model is evaluated to determine an anomaly detection result.

20 Claims, 10 Drawing Sheets

TIERED ANOMALY DETECTION

BACKGROUND OF THE INVENTION

Anomaly detection can be used to detect events that fall outside a normal trend. The detected deviation or outlier incident can be an indicator that an error, failure, defect, or suspicious event has occurred. When an anomaly has been detected, typically an operations team is notified of the incident and may be assigned to investigate and address the underlying cause. Common uses for anomaly detection include data cleaning, intrusion detection, fraud detection, system health monitoring, and ecosystem disturbances.

BRIEF DESCRIPTION OF THE DRAWINGS

Various embodiments of the invention are disclosed in the following detailed description and the accompanying drawings.

DETAILED DESCRIPTION

Figure 1:
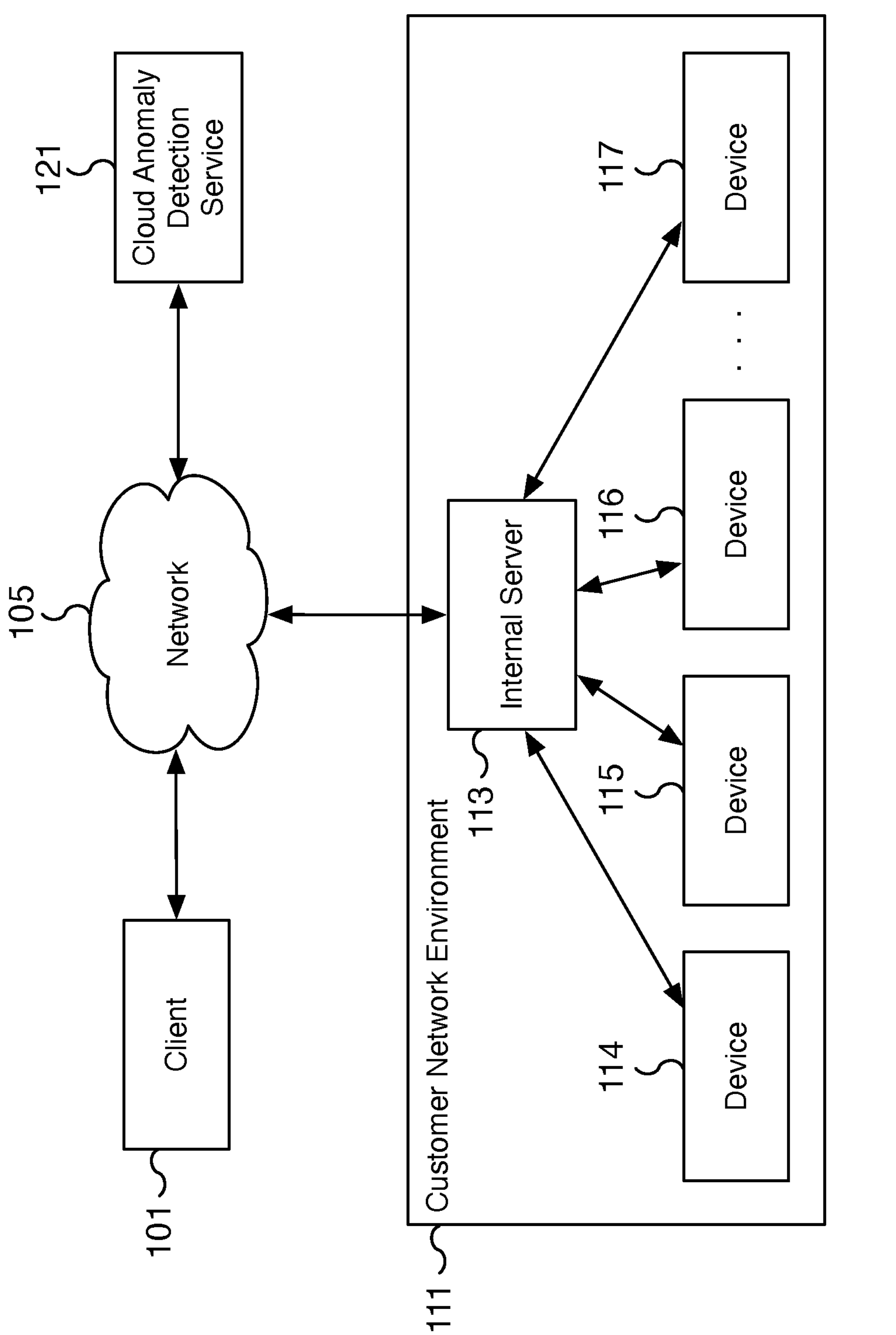
FIG. 1 is a block diagram illustrating an example of a network environment for performing the anomaly detection using a multi-tier system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term ‘processor’ refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tiered approach to anomaly detection is disclosed. For example, a first tier of an anomaly detection system utilizes a univariate machine learning model followed by a second tier of the anomaly detection system that utilizes a multi-variate machine learning model. The univariate model does not require dedicated hardware and, in comparison to the multi-variate model, the univariate model requires reduced resources for training, deployment, and inference. In various embodiments, a multi-variate machine learning model is deployed to dedicated machine learning prediction servers and functions to improve on the anomaly detection results of the first tier. For example, when a potential anomaly is detected by the univariate model, the detection results and a version of the input used by the univariate model are provided to the multi-variate model to determine a more precise prediction result. The prediction result of the multi-variate model is a refined and more accurate prediction than that provided by the univariate machine learning model. In some embodiments, the pairing of univariate and multi-variate machine learning models depends on the monitored target, such as a specific hardware and/or software profile. For example, different hardware and/or software assets can be classified as different configuration item types and a different set of univariate and multi-variate machine learning models can be trained and used for each configuration item type. In some embodiments, the multi-variate machine learning model is further trained using user feedback provided on results of its corresponding univariate model.

In some embodiments, hardware and/or software assets are tracked as configuration items, and each hardware and/or software asset can be assigned a configuration item type. By monitoring the configuration items, anomalies can be predicted and addressed. For example, a predicted anomaly can be detected in a database server that is exhibiting degrading query request performance that will likely ultimately lead to the database server refusing to accept database connections. Administrators can be notified of the detected anomaly and can preemptively address the performance issues ahead of the predicted failure.

In some embodiments, for each corresponding configuration item type of a plurality of different configuration item types, a corresponding multi-variate machine learning model of a plurality of multi-variate machine learning models is trained to perform anomaly detection for a corresponding configuration item type of the plurality of different configuration item types. For example, separate multi-variate machine learning models can be trained for each configuration item type such as for a database server type, a web application server type, a print server type, a corporate issued laptop for a sales representative, a corporate issued laptop for a front-end web engineer, etc. The different multi-variate models can be trained to predict anomalies based on the combined values of multiple input features, where the input features may differ for each configuration type. For example, input features for a database query server can include database specific features, such as the number of queries per second, the database table sizes, the number of entries in a database table, the number of concurrent database connections, etc., that are not utilized for training a multi-variate model for a different configuration item type.

In some embodiments, a univariate machine learning model is trained to detect a potential anomaly for each configuration item type in the context of different configuration item types. For example, a corresponding univariate machine learning model can be trained for each configuration item type. Unlike the corresponding trained multi-variate machine learning models, the univariate machine learning models detect anomalies based only on a single input feature (or monitored metric) being anomalous. For example, for a corresponding univariate machine learning model for a database server configuration item type, an anomalous input for any one of its input features triggers a potential anomaly. In some embodiments, the univariate machine learning models are statistical models and predict a potential anomaly when any one input feature (such as any single monitored metric of a configuration item) exceeds a configured threshold, such as one, two, or three standard deviations (or another threshold value) from the mean value or another baseline value of an input feature.

In particular embodiments, unlike the multi-variate machine learning models, the corresponding univariate machine learning model may not operate on time series data but have other advantages such as ease of training, ease of deployment, and reduced need for compute and memory resources, among other advantages. In some embodiments, the univariate machine learning models can be deployed on hardware with reduced requirements when compared to the machine learning prediction servers required to perform inference using the corresponding multi-variate machine learning models. For example, the univariate machine learning models can be deployed to perform inference using internal servers located within a customer IT infrastructure compared to the multi-variate machine learning models which may be deployed within a machine learning cloud service platform with dedicated resources for performing machine learning inference.

In some embodiments, in response to detecting, via a univariate machine learning model, an anomaly associated with a specific configuration item type of the plurality of different configuration item types, an execution of a particular multi-variate machine learning model of the plurality of multi-variate machine learning models is initiated for the specific configuration item type. For example, based on detecting an anomaly using the univariate machine learning model, a corresponding multi-variate machine learning model is applied to refine the anomaly detection results. The multi-variate machine learning model can be provided with a version of the input used by the univariate machine learning model to detect the initial potential anomaly. In some embodiments, the input provided to the multi-variate machine learning model is a reconstructed version of the input and can correspond to a time-series version of the input data. In various embodiments, both the univariate and multi-variate machine learning models used are specific to a configuration item type, and different models are trained for different configuration item types.

In some embodiments, an output of the execution of the particular multi-variate machine learning model is evaluated to determine an anomaly detection result. For example, the prediction result or output from applying inference using the multi-variate machine learning model is used to determine an anomaly detection result that is provided to users. In some embodiments, the determined anomaly detection result is the result provided to users via an interactive user interface dashboard. The same dashboard can be used to collect user feedback on anomaly detection results that can be used to retrain the appropriate multi-variate models. In some embodiments, the anomaly detection results are evaluated to meet a configured threshold, such as a sensitivity threshold. For example, a sensitivity threshold can be applied to the anomaly detection service based on an expected number of detected anomalies over a determined time period. In the event the detected anomalies exceed or fall short of the configured sensitivity, one or more corresponding models can be retrained and/or recalibrated.

In some embodiments, the deployed univariate model is a trained unsupervised machine learning model and the multi-variate model is a trained supervised machine learning model for each configuration item type. By using both the univariate and multi-variate machine learning models together, anomalies are predicted with a higher accuracy than by using only the unsupervised univariate machine learning model alone for prediction.

In some embodiments, an indication of a maturity of the anomaly detection service is determined and provided. For example, to incentivize users to provide feedback on machine learning prediction results, feedback on the maturity and the change in maturity of an anomaly detection service is provided. In some embodiments, the maturity is presented as a maturity score that can increase as additional user feedback is provided and as the prediction results improve. The maturity can be calculated using one or more loss calculations. In some embodiments, the maturity score can be based on loss calculation results for three or more epochs associated with the multi-variate machine learning model. For example, a running average of loss calculation results from past epochs can be calculated and used to determine the maturity of the prediction model or models. In some embodiments, the maturity can be determined by converting a logarithmic value, such as a logarithmic loss calculation result, to a linear value.

FIG. 1 is a block diagram illustrating an example of a network environment for performing the anomaly detection using a multi-tier system. In the example shown, the multi-tier anomaly detection system is a distributed system that includes client 101, cloud anomaly detection service 121, and components of customer network environment 111, which are all connected via network 105. Network 105 can be a public or private network. In some embodiments, network 105 is a public network such as the Internet. Using client 101, users are notified of detected anomalies within customer network environment 111 via cloud anomaly detection service 121. Customer network environment 111 includes one or more devices such as devices 114, 115, 116, and 117, as example devices, each with specific hardware and software profiles. In various embodiments, each hardware and/or software profile that is monitored for anomalies is a configuration item and has a configuration item type. Customer network environment 111 further includes internal server 113. Internal server 113 functions as the first tier of the anomaly detection system and is communicatively connected with both the devices of customer network environment 111 and cloud anomaly detection service 121. In the example shown, the second tier of the anomaly detection system is implemented by cloud anomaly detection service 121. Although not shown in FIG. 1, one or more agents monitor customer network environment 111 including the devices of customer network environment 111. For example, a monitoring agent can be installed on each of devices 114, 115, 116, and 117 to provide monitoring metrics to internal server 113 and cloud anomaly detection service 121 for anomaly detection.

In some embodiments, client 101 is an example client for accessing cloud anomaly detection service 121. Client 101 is a network device such as a desktop computer, a laptop, a mobile device, a tablet, a kiosk, a voice assistant, a wearable device, or another network computing device. As a network device, client 101 can access cloud-based services including cloud anomaly detection service 121. For example, a member of the information technology service management (ITSM) team can utilize a web browser or similar application from client 101 to receive notifications of a predicted anomaly, to review predicted anomalies (such as via an interactive dashboard), to view the performance of the anomaly detection service provided by cloud anomaly detection service 121, and/or to provide feedback on anomaly detection results provided by cloud anomaly detection service 121. Although shown in FIG. 1 as located outside of customer network environment 111, client 101 can also be located within customer network environment 111.

In some embodiments, cloud anomaly detection service 121 offers a cloud-based anomaly detection service for predicting anomalies such as those occurring within an IT infrastructure such as customer network environment 111. In various embodiments, the anomalies are predicted by performing an inference process using metrics collected on an environment such as by monitoring customer network environment 111 and its devices. Example metrics that can be collected and applied as input features for prediction include but are not limited to metrics related to network utilization, the number of incoming packets per second, the number of outgoing packets per second, device CPU speeds, device CPU temperatures, device memory usages, device swap sizes, and the number of running processes, among others. In various embodiments, cloud anomaly detection service 121 is a multi-tier system that relies on both univariate and multi-variate machine learning models. In the example shown, the multi-variate machine learning models are used for performing inference at cloud anomaly detection service 121 whereas the univariate machine learning models are used for performing inference at internal server 113. In various embodiments, the results of a univariate machine learning model are received at cloud anomaly detection service 121 where a corresponding multi-variate machine learning model can be applied to refine the anomaly detection results. In some embodiments, a version of the input data resulting in a detected anomaly by the univariate machine learning model is also forwarded and received by cloud anomaly detection service 121 and used by the corresponding multi-variate machine learning model.

In various embodiments, cloud anomaly detection service 121 utilizes one or more different multi-variate machine learning models such as a specific multi-variate machine learning model for each configuration item type. For example, depending on the configuration item and its configuration item type for which an anomaly is detected at internal server 113, a specific multi-variate machine learning model for the same configuration item type will be used to refine the anomaly result. In some embodiments, cloud anomaly detection service 121 further includes one or more dedicated machine learning servers such as machine learning prediction servers for use with multi-variate machine learning models. Cloud anomaly detection service 121 may also include training servers for training both univariate and multi-variate machine learning models and the corresponding components to deploy the necessary univariate models to internal server 113 once trained. Although not shown in FIG. 1, cloud anomaly detection service 121 can utilize one or more data stores such as one or more distributed databases. The data stores can be used to store the multi-variate machine learning models until they are needed and/or to track configuration items and their corresponding track configuration item types, among other data storage needs.

In some embodiments, cloud anomaly detection service 121 further provides an interactive user interface dashboard for displaying anomaly detection results and for collecting user feedback on predicted anomalies. For example, the provided dashboard can display a predicted anomaly and the features (or metrics) that influenced the predicted anomaly. In some embodiments, the top impacting features are displayed along with their contribution (such as a percentage value) to a predicted anomaly. In various embodiments, the prediction results are displayed along with the maturity of the anomaly detection models, such as the maturity corresponding to the models of the particular configuration item type used for the prediction results. For example, the more mature the anomaly detection models, the more accurate the prediction results. As more user feedback is provided, the accuracy of the underlying models will improve along with their maturity. In some embodiments, the maturity corresponds to the maturity of the trained multi-variate machine learning model, the trained univariate machine learning model, and/or the combination of the trained multi-variate and univariate machine learning models. In some embodiments, the maturity is presented as one or more scores such as a maturity score and a feedback score. For example, the maturity score can correspond to a loss metric calculated on the models (or a model) and a feedback score can be a difference in loss metrics between different model versions. By providing a feedback score based on a difference between scores, users are provided with a quantified assessment on how much the anomaly detection has improved based on their provided feedback. In some embodiments, the maturity score is initially determined as a result that is based on a logarithmic scale which is then converted to and presented as a linear value. In particular embodiments, the provided linear value is more easily understood by users than a logarithmic value and significantly improves user engagement in providing feedback on anomaly results resulting in a more accurate multi-variate machine learning model. In some embodiments, the multi-variate machine learning model is a supervised machine learning model and the corresponding univariate machine learning model is an unsupervised machine learning model.

In various embodiments, the multi-variate machine learning model is retrained more frequently or more often than the univariate machine learning model. For example, the multi-variate machine learning model is trained at a training rate that is greater than the training rate at which the univariate machine learning model is trained. By retraining the multi-variate machine learning model and updating the presented maturity and feedback scores, users are incentivized to become more actively engaged in the process of providing feedback. In various embodiments, the user feedback is collected by cloud anomaly detection service 121 via a user interface that allows the user to easily select whether a predicted anomaly is a true positive or a false positive and to further specify the relative impact of features on the predicted anomaly. The received user feedback is then used as training data to retrain a supervised multi-variate machine learning model.

In some embodiments, customer network environment 111 is an information technology network environment and includes multiple hardware devices including devices 114, 115, 116, and 117, as examples. Devices 114, 115, 116, and 117 correspond to hardware devices that are managed by an ITSM group and each device can be one of a variety of different hardware device types including networking equipment (such as gateways and firewalls), load balancers, servers including application servers and database servers among other servers, and other computing devices including employee laptops and desktops. In various embodiments, each device can correspond to one or more configuration items, such as a configuration item for each tracked asset such as a hardware and/or software asset. Example configuration items can include a device in its entirety, a hardware asset of a device such as a video card, display, or another hardware module or asset, a software asset installed on a device such as a particular operating system, an application, a specific version of an application, a plugin for an application, or another software module or asset, and/or another hardware and/or software device configuration item. In various embodiments, each configuration item is assigned a corresponding configuration item type based on its profile, characteristics, and/or configuration. In some embodiments, when performing anomaly detection, each configuration item is monitored for anomalies based on its configuration item type. Although not shown in FIG. 1, each device, such as devices 114, 115, 116, and 117, can have installed on it a monitoring agent for monitoring and collecting metrics, such as operating and configuration metrics, that are used to detect anomalies. In various embodiments, the monitored metrics are provided to internal server 113.

In the example shown, customer network environment 111 includes internal server 113. Internal server 113 can be a physical server or a virtual server and is located within the network environment of customer network environment 111. In various embodiments, internal server 113 can monitor operations such as data communications within customer network environment 111 and can receive monitored metrics from devices within customer network environment 111. For example, internal server 113 can receive monitored metrics from monitoring agents installed on devices 114, 115, 116, and 117. In various embodiments, internal server 113 functions as a first tier in detecting anomalies and performs its anomaly detection using the data it monitors and/or the data it receives from monitoring agents. For example, internal server 113 can be configured with univariate machine learning models for each configuration item type it is assigned to monitor for anomalies. Based on the configuration items internal server 113 is assigned to monitor, the appropriate univariate machine learning model is applied to the monitored metrics to detect anomalies. In various embodiments, the deployed univariate machine learning models to internal server 113 can be statistical models and are used to perform a first tier anomaly detection based on a monitored metric exceeding a configured threshold for a particular configuration item type. In the event internal server 113 detects an anomaly, the detected anomaly and corresponding and related metrics are forwarded to cloud anomaly detection service 121 for refinement.

Although single instances of some components have been shown to simplify the diagram of FIG. 1, additional instances of any of the components shown in FIG. 1 may exist. For example, cloud anomaly detection service 121 may be implemented using one or more servers such as one or more distributed application servers and/or machine learning servers. In some embodiments, the implementation of cloud anomaly detection service 121 further utilizes one or more databases. Different network topologies for implementing cloud anomaly detection service 121 are appropriate and the servers and/or databases utilized by cloud anomaly detection service 121 may be replicated and/or distributed across multiple servers, databases, and/or related components. Additionally, client 101 is an example client device for interfacing with cloud anomaly detection service 121. Although a single client is shown (i.e., client 101), many more additional clients can exist and can be used to interface with cloud anomaly detection service 121. As mentioned above, customer network environment 111 is just one example of a network environment of devices monitored for anomalies by cloud anomaly detection service 121. For example, in various embodiments, cloud anomaly detection service 121 can manage additional network environments not shown including different distributed environments and different sub-networks. Similarly, internal server 113 is an example of one internal server for performing an initial anomaly detection result using a univariate model that is refined by a multi-variate model by cloud anomaly detection service 121. Additional internal servers such as internal server 113 can be utilized with cloud anomaly detection service 121. For example, multiple internal servers can be deployed such as two or more internal servers per network environment to connect with cloud anomaly detection service 121. Similarly, different internal servers from different network environments can connect and utilize cloud anomaly detection service 121 as a second tier for refined anomaly detection. In some embodiments, components not shown in FIG. 1 may also exist.

Figure 2:
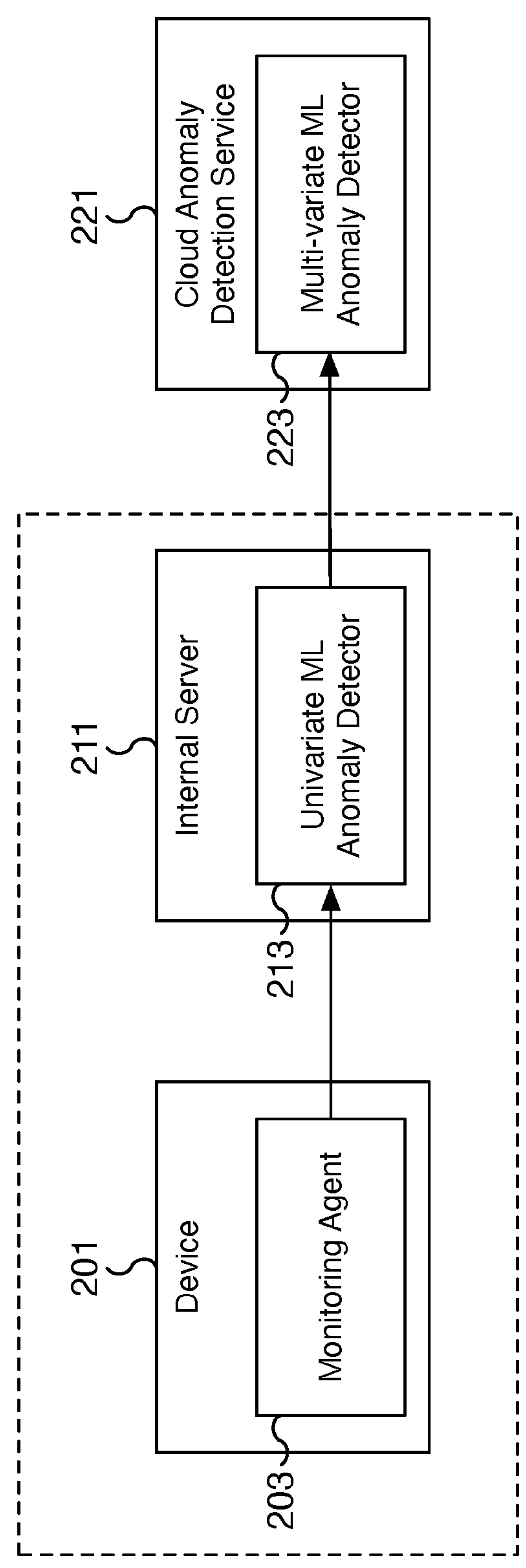
FIG. 2 is a block diagram illustrating an embodiment of a multi-tier anomaly detection system.

FIG. 2 is a block diagram illustrating an embodiment of a multi-tier anomaly detection system. In the example shown, multi-tier anomaly detection system 200 includes device 201 with monitoring agent 203, internal server 211 with univariate machine learning anomaly detector 213, and cloud anomaly detection service 221 with multi-variate machine learning anomaly detector 223. In various embodiments, the components of multi-tier anomaly detection system 200 are used to implement an anomaly detection service for predicting anomalies among devices such as device 201. In some embodiments, device 201 is a device located within an IT infrastructure monitored for anomalies such as customer network environment 111 of FIG. 1. In the example shown, device 201 and internal server 211 reside in the same network environment as represented by the rectangle encapsulating both device 201 and internal server 211 as compared to cloud anomaly detection service 221. In some embodiments, cloud anomaly detection service 221 is accessible via an external network such as the Internet. In some embodiments, device 201 is device 114, 115, 116, and/or 117 of FIG. 1, internal server 211 is internal server 113 of FIG. 1, and/or cloud anomaly detection service 221 is cloud anomaly detection service 121 of FIG. 1. In some embodiments, users interact with multi-tier anomaly detection system 200 via an interactive user interface dashboard hosted by cloud anomaly detection service 221.

In some embodiments, device 201 is an example client device being monitored for anomalies. Device 201 includes monitoring agent 203 to monitor device 201 by collecting operating and configuration metrics. Monitoring agent 203 is configured with the proper permissions to access and collect metrics of device 201 such as processor temperatures, processor utilizations, processor operating frequencies, memory usages, swap sizes, running processes, memory usages of processes, application error messages, network utilizations, installed applications and operating systems including version numbers, etc. In various embodiments, monitoring agent 203 is configured to establish a connection with internal server 211 and provides internal server 211 with the collected monitoring metrics of device 201.

In some embodiments, internal server 211 is a server located within a customer network infrastructure and is communicatively connected to devices within the network such as device 201. Internal server 211 receives monitoring metrics from device 201 and can perform a first tier of anomaly detection for device 201 (and for other devices not shown). In some embodiments, internal server 211 can itself also monitor the network infrastructure and can use its collected data in combination with the data received from agents such as monitoring agent 203 to perform anomaly detection. As shown in the example of FIG. 2, internal server 211 includes univariate machine learning anomaly detector 213. In various embodiments, univariate machine learning anomaly detector 213 utilizes univariate machine learning models to detect anomalies. The univariate machine learning models can be trained unsupervised machine learning models that are deployed to internal server 211. In various embodiments, the specific model used by internal server 211 and specifically by univariate machine learning anomaly detector 213 is based on the configuration item type of the monitored configuration item. For example, univariate machine learning anomaly detector 213 will utilize the univariate machine learning models for the configuration item types assigned to device 201. In some embodiments, each univariate machine learning model is a statistical model and is configured (or trained) with one or more threshold values that when a monitored metric exceeds the corresponding threshold value will trigger the detection of a potential anomaly.

In various embodiments, internal server 211 and univariate machine learning anomaly detector 213 are communicatively connected to cloud anomaly detection service 221. For example, univariate machine learning anomaly detector 213 provides detected potential anomalies and versions of the corresponding monitored metrics related to the detected potential anomaly to cloud anomaly detection service 221 and specifically to multi-variate machine learning anomaly detector 223. The provided data can be used as input features for multi-variate machine learning anomaly detector 223 to perform a second and more refined tier of anomaly detection to determine improved anomaly detection results. In some embodiments, the input data received by multi-variate machine learning anomaly detector 223 is preprocessed, for example, by univariate machine learning anomaly detector 213, to generate time-series input data for multi-variate machine learning anomaly detector 223.

In some embodiments, the functionality of internal server 211 including univariate machine learning anomaly detector 213 is implemented by the monitored device such as device 201. Although shown in FIG. 2 as separate components, internal server 211 can be combined with device 201. For example, the anomaly detection performed using the univariate machine learning model of univariate machine learning anomaly detector 213 can be performed by device 201 instead of using a separate prediction server as shown in FIG. 2. In various embodiments, monitoring agent 203 and univariate machine learning anomaly detector 213 can be further combined and/or run on the same device.

In some embodiments, cloud anomaly detection service 221 is a cloud service hosted outside of the IT infrastructure being monitored. For example, in particular embodiments, cloud anomaly detection service 221 can be accessed by clients via a web browser and with access to the Internet and the appropriate user credentials. Cloud anomaly detection service 221 includes multi-variate machine learning anomaly detector 223 which relies on different multi-variate machine learning models for each configuration item type. When a potential anomaly is detected by univariate machine learning anomaly detector 213, machine learning inference is performed by multi-variate machine learning anomaly detector 223 using a version of the input received at univariate machine learning anomaly detector 213 and the output of univariate machine learning anomaly detector 213. Multi-variate machine learning anomaly detector 223 then applies the correct corresponding multi-variate machine learning model to infer a more accurate anomaly prediction result. In some embodiments, cloud anomaly detection service 221 includes dedicated machine learning hardware including machine learning prediction servers for performing inference on the provided input features. In various embodiments, the anomaly detection results are provided by cloud anomaly detection service 221 to users via an interactive user interface dashboard. In some embodiments, the users can further provide user feedback on anomaly detection results which are then used to retrain one or more multi-variate machine learning models used by multi-variate machine learning anomaly detector 223.

In some embodiments, the two-tier anomaly detection can be bypassed and a user can schedule an anomaly detection request to use only multi-variate machine learning anomaly detector 223. For example, instead of requiring univariate machine learning anomaly detector 213 to initiate an anomaly prediction request at cloud anomaly detection service 221 with multi-variate machine learning anomaly detector 223, the user instead initiates a request to perform an anomaly detection prediction using only multi-variate machine learning anomaly detector 223. In particular scenarios, the ability to bypass univariate machine learning anomaly detector 213 may be desirable, such as when investigating a past incident to confirm whether any anomalies occurred and/or may have been missed. In various embodiments, the direct request for an anomaly detection result from multi-variate machine learning anomaly detector 223 is an alternative pathway for anomaly detection but does not benefit from the scalability and reduced overall resource requirements including compute and memory requirements, among other benefits, offered by multi-tier anomaly detection.

Figure 3:
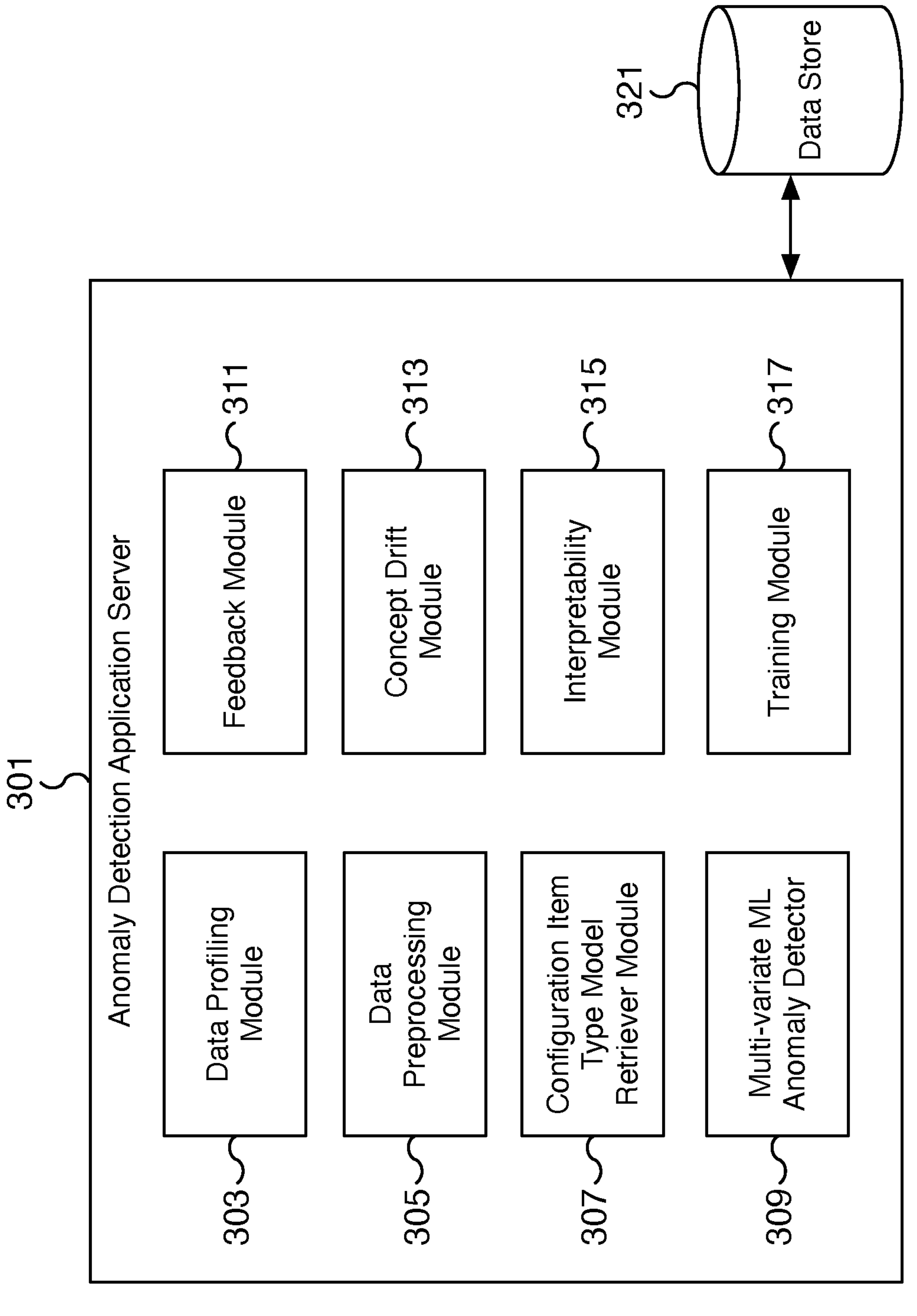
FIG. 3 is a block diagram illustrating an embodiment of a cloud anomaly detection service for implementing a multi-tier anomaly detection system.

FIG. 3 is a block diagram illustrating an embodiment of a cloud anomaly detection service for implementing a multi-tier anomaly detection system. In the example shown, cloud anomaly detection service 300 includes anomaly detection application server 301 and data store 321. In various embodiments, the shown components of anomaly detection application server 301 and data store 321 are used to implement portions of a multi-tier anomaly detection service for predicting anomalies. For example, anomaly detection application server 301 using data store 321 implements the functionality for training one or more models for detecting anomalies in an IT infrastructure. In some embodiments, anomaly detection application server 301 functions as the second tier of a multi-tier anomaly detection system for both training and prediction using multi-variate machine learning models but is also used to train univariate machine learning models for deployment to a first tier of a multi-tier anomaly detection system. In some embodiments, cloud anomaly detection service 300 is cloud anomaly detection service 121 of FIG. 1 and/or cloud anomaly detection service 221 of FIG. 2.

In some embodiments, anomaly detection application server 301 includes multiple modules as shown in FIG. 3 for implementing the different functionality of anomaly detection service 300. As shown in the example, anomaly detection application server 301 includes data profiling module 303, data preprocessing module 305, configuration item type model retriever module 307, multi-variate machine learning anomaly detector 309, feedback module 311, concept drift module 313, interpretability module 315, and training module 317. Although shown as distinct modules, the functionality of the modules of anomaly detection application server 301 may be implemented in fewer or more modules and/or distributed across different application servers. For example, some of the modules may be combined into a single module and/or some of the modules may be separated, replicated, and/or distributed into or as additional modules, as appropriate. Moreover, although anomaly detection application server 301 is shown as a single server, its functionality can be implemented and/or distributed across multiple servers including multiple distributed servers. For example, multi-variate machine learning anomaly detector 309 can be implemented using one or more machine learning inference servers different from the machine learning training servers of training module 317. Similarly, one or more machine learning training servers can be used to train univariate machine learning models for different configuration item types and/or the same, different, or a subset of the same servers can be used to train multi-variate machine learning models for the same corresponding configuration item types.

In some embodiments, data profiling module 303 is a processing module for evaluating potential training data to determine whether the data fits the profile of useful training data. For example, potential training data can be evaluated to determine whether the values associated with a particular metric are constant and/or have characteristics associated with useful training data. In various embodiments, metrics with constant (or stationary) values can be excluded by data profiling module 303 from the training dataset. In some embodiments, data profiling module 303 can apply one or more configured filters and/or checks to evaluate a metric to determine whether the metric will be a useful feature to train on. Metrics that meet the profile for useful training data can be passed to data preprocessing module 305.

In some embodiments, data preprocessing module 305 is a processing module for preparing the identified training data for use in training the univariate and/or multi-variate machine learning models. In some embodiments, data preprocessing module 305 will forward fill values for certain features such as in the case of missing values. In some embodiments, data preprocessing module 305 will fill missing older values, for example, with the mean value of the metric or another appropriate value. In various embodiments, the univariate machine learning model includes an auto-encoder that learns the provided feature data and data preprocessing module 305 prepares the training data by removing data associated with anomalies allowing the univariate machine learning model to be retrained with training data that does not include anomalies. In some embodiments, data preprocessing module 305 prepares the data such that the univariate machine learning model can be trained to not only predict anomalies but to also reconstruct the input provided to the univariate machine learning model for use as input to the corresponding multi-variate machine learning model for the same configuration item type.

In some embodiments, data preprocessing module 305 preprocesses user collected feedback including label feedback for training a multi-variate machine learning model for multi-variate machine learning anomaly detector 309. For example, user feedback collected in a natural language can be processed and utilized as label data for machine learning training including supervised training. In some embodiments, the user feedback is processed to prepare training data to train a classifier for classifying anomaly results outputted by a corresponding univariate machine learning anomaly detector such as univariate machine learning anomaly detector 213 of FIG. 2. The received data for preprocessing can include reconstructed input data received by a univariate machine learning anomaly detector and used as input data for multi-variate machine learning anomaly detector 309.

In some embodiments, configuration item type model retriever module 307 is a processing module for preparing and loading the appropriate multi-variate machine learning model for multi-variate machine learning anomaly detector 309. For example, each configuration item can require its own specific machine learning model trained using features, thresholds, and/or sensitivities specific to its configuration item type. In various embodiments, the different multi-variate machine learning models are loaded into memory and/or swapped out of memory as needed and/or appropriate based on configuration item type. In some embodiments, configuration item type model retriever module 307 loads the appropriate models from data store 321 for multi-variate machine learning anomaly detector 309 to perform an inference using the requested model for a specific configuration item type.

In some embodiments, multi-variate machine learning anomaly detector 309 is a processing module for inferring anomaly prediction results using a multi-variate machine learning model. For example, using anomaly prediction results from a univariate machine learning anomaly detector, multi-variate machine learning anomaly detector 309 can refine the prediction result to provide an improved result with greater accuracy. In some embodiments, multi-variate machine learning anomaly detector 309 is an anomaly classifier that classifies the provided anomaly prediction results outputted from a corresponding univariate model to provide an additional determination layer for evaluating potential anomalies. In some embodiments, multi-variate machine learning anomaly detector 309 also receives as input a reconstructed version of the input utilized by a univariate machine learning anomaly detector to predict the corresponding anomaly prediction result. In various embodiments, in addition to predicting anomaly results with greater accuracy than a univariate machine learning anomaly detector using a univariate machine learning model, multi-variate machine learning anomaly detector 309 can also predict a severity associated with a detected anomaly. For example, multi-variate machine learning anomaly detector 309 can detect a predicted anomaly with a severity score, ranking, or another severity metric. Example severity rankings can include a minor, severe, or critical severity rank.

In some embodiments, multi-variate machine learning anomaly detector 309 utilizes an expert sub-model that is trained with user provided feedback or labelling. The machine learning model of multi-variate machine learning anomaly detector 309 can be a supervised machine learning model and can be trained quickly in order to incorporate feedback in real time or near real time. By training the model quickly and/or frequently, the impact of the provided user feedback on improvements in prediction accuracy can be provided to the user. Compared to the univariate model of a corresponding univariate machine learning anomaly detector, multi-variate machine learning anomaly detector 309 is trained much more frequently. In some embodiments, the multi-variate machine learning model of multi-variate machine learning anomaly detector 309 is trained using training module 317 on data including user feedback data processed using data preprocessing module 305.

In some embodiments, feedback module 311 is a processing module for collecting user feedback on detected anomalies including predicted anomalies. For example, feedback module 311 can implement an interactive user interface dashboard for presenting detected anomalies and the corresponding user interface components to receiving user feedback including label feedback on the prediction results. Example user feedback can include whether a predicted anomaly is a true positive or a false positive along with feedback on the features used in the prediction. As another example, collected user feedback can include whether an anomaly alert is useful or not useful and the reasons why. In various embodiments, feedback module 311 can also present feature data including data on the metrics used to predict an anomaly and receive corresponding user feedback on what anomalies should or should not have impacted the prediction. In some embodiments, feedback module 311 operates as a notification system which accepts feedback on the notification results. In various embodiments, the feedback collected via feedback module 311 is preprocessed as training data for training multi-variate machine learning anomaly detector 309. In some embodiments, the collected feedback data is preprocessed by data preprocessing module 305.

In some embodiments, feedback module 311 provides a maturity associated with the anomaly detection and/or a maturity of the corresponding models used by cloud anomaly detection service 300. For example, a maturity score and/or feedback score of multi-variate machine learning anomaly detector 309 and/or a corresponding univariate machine learning anomaly detector can be presented that corresponds to the accuracy of the trained model(s) and the improvement in the anomaly detection given the provided user feedback. In some embodiments, feedback module 311 presents the maturity score as a linear value after first calculating one or more loss calculation results that are represented on an exponential scale. In various embodiments, feedback module 311 can also present the features that influence the prediction results. For example, the top features that are determined to have resulted in (or influenced) a predicted anomaly are presented, allowing the user to provide feedback on whether the metrics should have been as heavily weighted for determining the prediction result. In various embodiments, the features and their corresponding contributions are determined by interpretability module 315.

In some embodiments, concept drift module 313 is a processing module for evaluating whether the models utilized by cloud anomaly detection service 300 need retraining and/or recalibration. For example, concept drift module 313 can determine whether the model of multi-variate machine learning anomaly detector 309 and/or its corresponding univariate machine learning anomaly detector has drifted sufficiently far away from its configured and/or intended purpose. In some embodiments, the drift is determined by evaluating the reconstruction error of the corresponding trained model and comparing the error to a configured threshold value. In various embodiments, concept drift module 313 can initiate the retraining of a model, for example, by utilizing training module 317 to retrain a univariate machine learning model of a univariate machine learning anomaly detector. In some embodiments, concept drift module 313 is also used to evaluate the multi-variate machine learning model of multi-variate machine learning anomaly detector 309 and can initiate the retraining for its associated model.

In some embodiments, interpretability module 315 is a processing module for evaluating prediction anomalies to determine which metrics are most responsible for the prediction result. In some embodiments, interpretability module 315 can determine a contribution associated with the input features including a contribution percentage to attribute to the features. For example, interpretability module 315 can determine the top metrics that influenced a predicted anomaly and present their corresponding contributions as a ranking, a ranked score, and/or a contribution percentage. In various embodiments, the results of interpretability module 315 are provided to the user, for example, via feedback module 311, to initiate user feedback including feedback on the interpreted metric results.

In some embodiments, training module 317 is a processing module for training the machine learning models of cloud anomaly detection service 300 and in particular the models of multi-variate machine learning anomaly detector 309 and corresponding univariate machine learning anomaly detectors, such as corresponding univariate machine learning anomaly detector 213 of FIG. 2. In some embodiments, training module 317 is implemented as different and/or distinct training modules for training univariate machine learning models and multi-variate machine learning models and/or for training models for different configuration item types. In some embodiments, the univariate models are trained using unsupervised machine learning and the multi-variate models are trained using supervised machine learning. For example, the model of a univariate machine learning anomaly detector can be trained as an unsupervised univariate machine learning model and the model of multi-variate machine learning anomaly detector 309 can be trained as a supervised multi-variate expert sub-model. Moreover, the training frequency and the amount of processing power and/or data required to train each model may be different and require different resources. In various embodiments, the training data for training the respective models is preprocessed and/or prepared by data profiling module 303 and/or data preprocessing module 305. In some embodiments, training module 317 relies on one or more dedicated machine learning training servers and once a model is trained, it can be stored at data store 321. In various embodiments, the trained univariate models can be deployed to the various first tier anomaly detection servers such as internal server 113 of FIG. 1 and/or internal server 211 of FIG. 2. The trained multi-variate models can be deployed to multi-variate machine learning anomaly detector 309.

In some embodiments, data store 321 corresponds to one or more data stores utilized by anomaly detection application server 301 for storing and/or retrieving data for anomaly detection including model data. For example, data store 321 can store univariate and/or multi-variate machine learning model data as well as training data for training univariate and/or multi-variate machine learning models. In some embodiments, data store 321 is used to store user feedback collected via feedback module 311 and/or the configuration and/or results for the various modules of anomaly detection application server 301 including data profiling module 303, data preprocessing module 305, configuration item type model retriever module 307, multi-variate machine learning anomaly detector 309, feedback module 311, concept drift module 313, interpretability module 315, and/or training module 317. In some embodiments, data store 321 is implemented as one or more distributed and/or replicated data stores or databases. For example, one or more portions of data store 321 may be located at a different physical location (such as in a different data center) than anomaly detection application server 301. In various embodiments, data store 321 is communicatively connected to anomaly detection application server 301 via one or more network connections.

Figure 4:
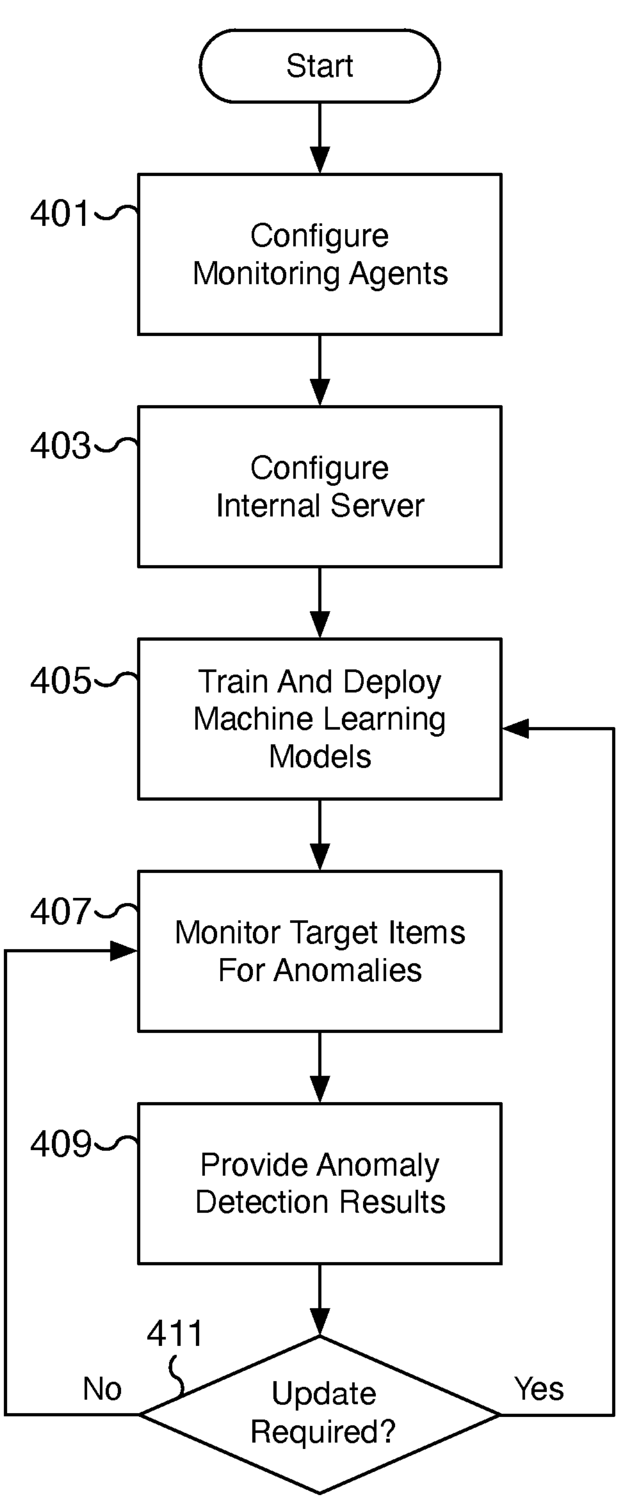
FIG. 4 is a flow chart illustrating an embodiment of a process for performing anomaly detection using a multi-tier anomaly detection system.

FIG. 4 is a flow chart illustrating an embodiment of a process for performing anomaly detection using a multi-tier anomaly detection system. For example, using the process of FIG. 4, a cloud anomaly detection service notifies users of detected anomalies, such as within an IT infrastructure environment, based on provided input data. The provided input data can be metrics collected by monitoring the target environment. In various embodiments, the cloud anomaly detection service utilizes a first tier of anomaly detection using univariate models specific for the configuration profiles of each monitored configuration item within the target environment. When an anomaly is detected by the first tier, a second tier performs a more thorough analysis using a multi-variate machine learning model for the same configuration profile (or configuration item type). For example, the output of a univariate machine learning anomaly detector is fed to a multi-variate machine learning anomaly detector to predict anomalies. In some embodiments, the multi-variate machine learning anomaly detector is an anomaly classifier. Based on the anomaly results provided by the multi-tier anomaly detection system, users can provide feedback that is collected and utilized to train (and subsequently retrain) the machine learning models. In some embodiments, the cloud anomaly detection service is cloud anomaly detection service 121 of FIG. 1, cloud anomaly detection service 221 of FIG. 2, and/or cloud anomaly detection service 300 of FIG. 3. In some embodiments, the univariate machine learning models are associated with internal server 113 of FIG. 1 and/or internal server 211 of FIG. 2 and/or the multi-variate machine learning models are associated with the cloud anomaly detection service. In some embodiments, the anomaly detection results are provided to and user feedback is collected from a client such as client 101 of FIG. 1. In some embodiments, the anomalies are detected within an IT infrastructure environment such as customer network environment 111 of FIG. 1.

At 401, monitoring agents are configured. For example, one or more monitoring agents are deployed to devices within the monitored IT infrastructure. Example devices include devices 114, 115, 116, and/or 117 of FIG. 1 and/or device 201 of FIG. 2. The monitoring agents, such as monitoring agent 203 of FIG. 2, can be installed on the devices that are monitored and are granted access permissions to collect the requirement metrics for predicting anomalies. In some embodiments, the monitoring agents are configured to communicate with an internal server. For example, the collected metrics are provided to the internal server for performing a first tier of anomaly detection. In some embodiments, the monitoring agents are configured to receive configuration updates including configuration data and/or parameters for monitoring metrics from the internal server.

At 403, an internal server is configured. For example, one or more internal servers are configured to function as a first tier for detecting anomalies. In some embodiments, the internal server is internal server 113 of FIG. 1 and/or internal server 211 of FIG. 2. The internal server is configured to accept data from the monitoring agents configured at 401 and to communicate with a corresponding second tier of the anomaly detection system. For example, the internal server is configured to communicate with both local monitoring agents as well as a cloud anomaly detection service. In some embodiments, the internal server is combined with a monitored device and the first tier of anomaly detection is performed on the monitored device. For example, in particular embodiments, the internal server is implemented as a virtual server running on a monitored device. In some embodiments, the internal server is configured to receive configuration updates including updated models from the cloud anomaly detection service. In some embodiments, the internal server can be configured to monitor metrics in addition to the agents configured at 401. For example, the internal server can be configured to monitor network and/or infrastructure metrics that can be used for anomaly detection.

At 405, machine learning models are trained and deployed. For example, machine learning models are trained for each configuration item type. In various embodiments, a univariate model and a multi-variate model combination is trained for each configuration item type. In some embodiments, the univariate model can be trained with unsupervised machine learning and the multi-variate model can be trained with supervised machine learning. Once the models are trained, the univariate model can be deployed to the internal server configured at 403. In some embodiments, multiple internal servers are configured, and each received the required univariate model for the configuration items within its domain based on the corresponding configuration item types. In various embodiments, the trained multi-variate models are located and/or accessed by the cloud anomaly detection service and can be stored in a cloud-based data store and loaded from storage when required.

In some embodiments, the step of 405 is a retraining and/or recalibration step. For example, after an initial set of trained univariate and multi-variate models are deployed on an internal server and the cloud anomaly detection service, respectively, one or more of the models may be retrained and/or recalibrated as required. For example, new training data can be received and/or prepared and can be used to retrain the model. As another example, the performance of the models may no longer meet configuration thresholds such as sensitivity thresholds and the models can be recalibrated and/or retrained to meet their expected configuration. In some embodiments, the multi-variate models are trained more often than the corresponding univariate models.

At 407, target items are monitored for anomalies. For example, target configuration items within the target IT environment such as a customer network environment are monitored for operating conditions such as operating and/or configuration metrics. The collected metrics are collected using the monitoring agents configured at 401 and/or the internal server configured at 403 for use as potential input features for anomaly detection. The collected metrics correspond to the metrics utilized for training the models at 405. Example features can include network utilization, number of incoming packets per second, number of outgoing packets per second, device CPU speed, device CPU temperature, device memory usage, and device swap size, among others. In various embodiments, the collected metrics are provided to the internal server configured at 403 for performing a first tier of anomaly detection. In the event the internal server detects a potential anomaly, the predicted potential anomaly and related metrics and results are provided to a second tier of the anomaly detection system located at the cloud anomaly detection service. The second tier of the anomaly detection system performs a multi-variate anomaly detection prediction. In some embodiments, the second tier of the anomaly detection system implemented by the cloud anomaly detection service functions as an expert sub-model.

At 409, anomaly detection results are provided. For example, the anomaly detection prediction results from performing anomaly detection using the multi-tier anomaly detection system are provided to the users. The results can be provided by the cloud anomaly detection service as anomaly notifications such as via an interactive user interface dashboard although other notification techniques are appropriate as well. The predicted anomaly detection results can include the configuration item with the predicted anomaly, the configuration item type of the item, a severity of the anomaly, and/or factors that contributed to the anomaly prediction such as which monitored metrics and their corresponding values contributed to the results.

In some embodiments, as part of the process of providing anomaly detection results, users can respond to the results by providing user feedback on the predicted anomaly. For example, user feedback including labeling feedback can be collected by the cloud anomaly detection service on the provided anomaly detection results. In some embodiments, the results are collected via an interactive user interface dashboard. For example, when a predicted anomaly is provided, the user can specify whether the anomaly information is helpful or not helpful such as whether the anomaly is a true or false positive. The user can further provide information on the features that should correctly and/or should not incorrectly influence the prediction result, among other feedback responses. In some embodiments, the user feedback is optional feedback and is provided via a user interface that streamlines collecting user feedback. Moreover, in various embodiments, the maturity of the anomaly detection service and its particular model or models is provided. As additional feedback is provided by users, the anomaly detection results will increase in accuracy along with the determined maturity of the anomaly detection service, its corresponding models, and in particular the supervised machine learning model. The provided maturity can be a maturity score and/or feedback score and can function as an incentive for users to provide additional feedback.

In some embodiments, the anomaly detection results provided are results performed from an on-demand anomaly detection request, such as a request to detect anomalies initiated by the user instead of being identified and initiated by the internal server and/or the first tier of the anomaly detection system. In various embodiments, on-demand anomaly detection requests may not necessarily be performed on real-time data and can be scheduled to be performed when resources are available. For example, on-demand anomaly detection requests may also be performed on collected historical metrics data and their results can be beneficial when investigating past incidents. If initiated on historical data with more relaxed time constraints than real-time anomaly detection, the requested on-demand anomaly prediction can be scheduled to be performed during periods of non-peak resource usages. In various embodiments, on-demand anomaly detection requests utilize the data collected at 407 from the agents configured at 401 and/or the internal server configured at 403 but are not initiated by a potential anomaly detected by the internal server.

At 411, a determination is made whether an update is required. For example, an update may be required for the anomaly detectors and specifically for the models that they rely on. For example, the univariate and/or multi-variate machine learning models may require retraining and/or recalibration. In some embodiments, additional user feedback is collected at 409 and can be used to retrain one or more machine learning models. In some embodiments, the anomaly detection is no longer within a configured threshold such as a sensitivity threshold and the models require retraining and/or recalibration. For example, the models may have drifted from an expected configuration and an update is required. Other reasons for updates can be appropriate as well, such as the reconfiguration of a configuration item that requires the deployment of a different univariate model to the internal server. In the event a determination is made that an update is required, processing loops back to 405 where models are retrained, recalibrated, and/or deployed. In the event a determination is made that an update is not required, processing loops back to 407 where monitoring for anomalies continues.

Figure 5:
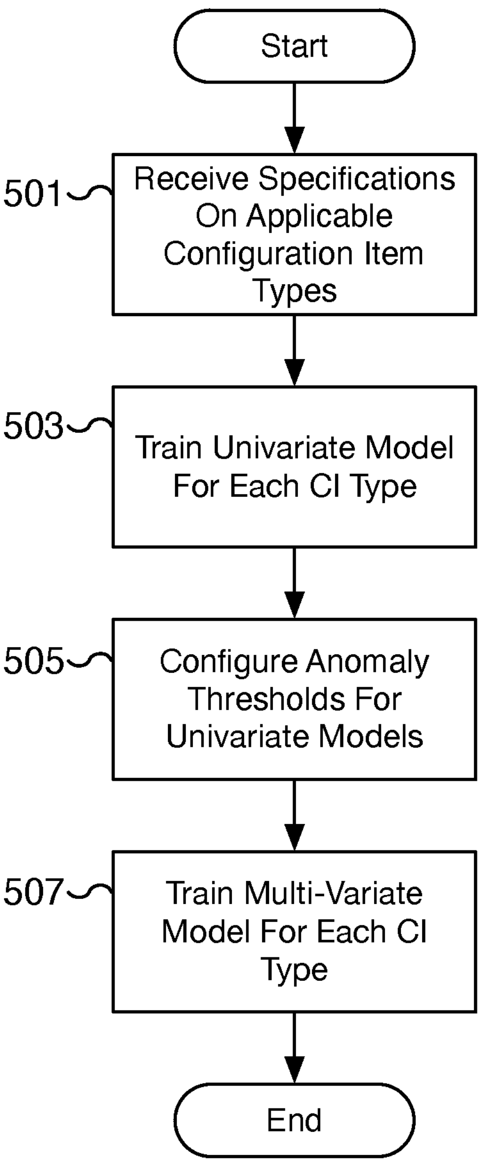
FIG. 5 is a flow chart illustrating an embodiment of a process for training machine learning models for a multi-tier anomaly detection system.

FIG. 5 is a flow chart illustrating an embodiment of a process for training machine learning models for a multi-tier anomaly detection system. For example, using the process of FIG. 5, a pair of univariate and multi-variate machine learning models can be trained for each specific configuration item type. In various embodiments, the configuration items monitored for anomalies are each assigned and/or associated with one or more configuration item types. A specific pair of univariate and multi-variate machine learning models trained for each configuration item type is used to detect anomalies associated with configuration items based on their assigned configuration item types. In some embodiments, the models are trained using both supervised and unsupervised training. For example, the univariate models can be trained using unsupervised machine learning and the multi-variate models can be trained using supervised machine learning. Although the process of FIG. 5 describes training both models of a specific configuration item type together, in various embodiments, each of the models for a specific configuration item type can be trained individually and/or independently. For example, the multi-variate machine learning model can be trained more frequently than its corresponding univariate machine learning model or vice versa.

In some embodiments, a cloud anomaly detection service performs the process of FIG. 5 to train the machine learning models for use by a multi-tier anomaly detection system. In some embodiments, the cloud anomaly detection service is cloud anomaly detection service 121 of FIG. 1, cloud anomaly detection service 221 of FIG. 2, and/or cloud anomaly detection service 300 of FIG. 3. In some embodiments, once trained, the univariate machine learning models are associated with and deployed to an internal server such as internal server 113 of FIG. 1 and/or internal server 211 of FIG. 2 and/or the multi-variate machine learning models are associated and utilized by the cloud anomaly detection service. In some embodiments, the trained models are stored on a cloud data store such as data store 321 of FIG. 3.

At 501, specifications on applicable configuration item types are received. For example, a list and/or description of all applicable configuration item types deployed (or expected to be deployed) and that need corresponding models for performing anomaly detection is received. In some embodiments, the context of available configuration item types is received and used to determine which models require training and subsequent deployment. For example, a pair of univariate and multi-variate machine learning models is required for each active configuration item type. In some embodiments, the configuration item types are received along with their associated features and/or a specification of their training data. For example, a specification of collected metrics including historical data can be received as part of receiving the specifications for the applicable configuration item types.

At 503, a univariate machine learning model is trained for each configuration item type. For example, using the specifications received at 501, a univariate machine learning model is trained for each applicable configuration item type. In some embodiments, the univariate machine learning models are statistical models and do not require time series data for performing predictions. For example, the univariate models can be used to determine whether a particular metric is an anomaly based on the provided training data. In some embodiments, a trained univariate machine learning model can evaluate whether any one metric associated with a configuration item of a specific configuration item type is anomalous but does not consider the combinations of metrics together when detecting anomalies. In various embodiments, the different models for each configuration item type are trained independently since they may each rely on different features and training data. In various embodiments, the univariate machine learning models are trained using unsupervised machine learning.

At 505, anomaly thresholds are configured for each univariate machine learning model. In various embodiments, each univariate machine learning model trained at 503 is configured with one or more anomaly thresholds. For example, based on a configured anomaly threshold, an anomaly can be detected when an input metric feature exceeds the configured anomaly threshold. In some embodiments, an anomaly threshold is based on a standard deviation from an expected value such as the mean value of a metric. For example, an anomaly threshold can be configured with respect to one, two, or three standard deviations from an expected mean value for a metric. Although described with respect to standard deviations, other reference points including other statistical metrics can be utilized as well for configuring anomaly thresholds. In some embodiments, the anomaly thresholds are configured by an IT administrator, automatically, and/or based on default values. In some embodiments, multiple anomaly thresholds can be configured, for example, to set different upper and lower bounds and/or to configure different levels of anomaly severity. In some embodiments, the step of 505 is performed as part of training the univariate models at 503. In some embodiments, the univariate machine learning model is trained as an auto-encoder and outputs a version of the input data it receives such as a reconstructed version of the received input. The reconstructed input can be provided as input to the corresponding multi-variate machine learning model.

At 507, a multi-variate machine learning model is trained for each configuration item type. For example, using the specifications received at 501, a multi-variate machine learning model is trained for each applicable configuration item type and functions as a more accurate model than the corresponding univariate model for the same configuration item type. In some embodiments, the multi-variate machine learning models utilize time series data for performing predictions. As multi-variate models, each multi-variate machine learning model is trained to detect anomalies based on multiple input features and their relationships to one another. In various embodiments, the different models for each configuration item type are trained independently since they may each rely on different features and training data. In some embodiments, the training for the multi-variate machine learning model uses supervised machine learning. For example, the training data can include user feedback data that has been processed as labeled training data.

In some embodiments, the multi-variate machine learning models are retrained using an existing trained model such as a previous or current version of the model for the same configuration item type. For example, the current version of the model can be used along with more current training data to retrain the model. By including existing models as part of the training process, the additional training data used for training can consist of a smaller training data set. Moreover, the additional training data can be a limited data set, such as limited to the most recently collected data. In some embodiments, by using a limited data set along with an existing trained model for retraining, historical data based on a certain date, a cutoff, or another exclusion protocol can be completely removed and no requirements are needed for its storage.

In some embodiments, along with an anomaly prediction result or classification result, the output of the multi-variate machine learning models can include an anomaly severity such as whether a predicted anomaly is a minor, major, or severe anomaly. Other measurements of the severity of a predicted anomaly such as a ranking or rating can used as well. In some embodiments, the multi-variate machine learning models are trained for use as an anomaly classifier that classifies the anomaly results of corresponding univariate anomaly detectors.

Figure 6:
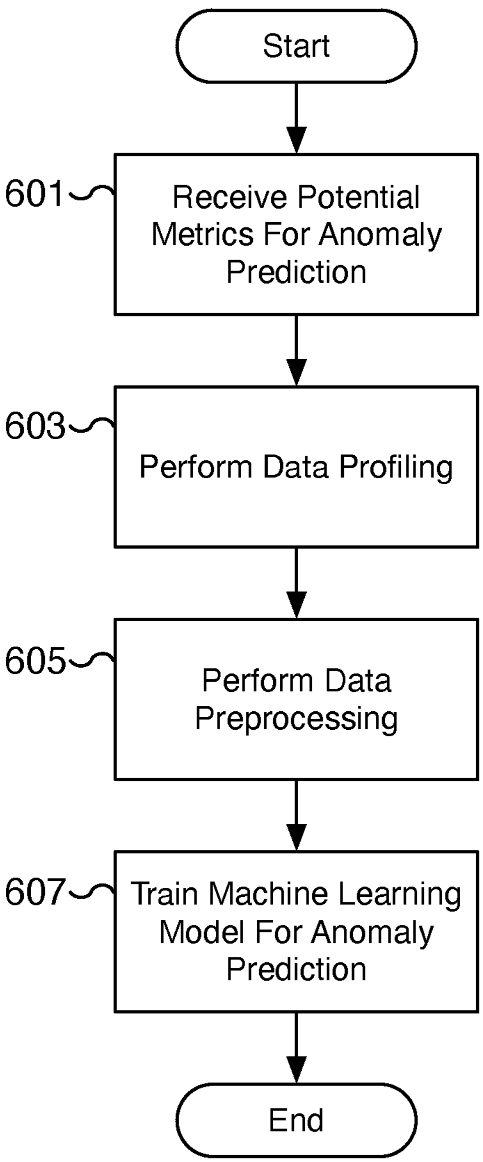
FIG. 6 is a flow chart illustrating an embodiment of a process for configuring and training machine learning models for anomaly detection.

FIG. 6 is a flow chart illustrating an embodiment of a process for configuring and training machine learning models for anomaly detection. For example, using the process of FIG. 6, a univariate or multi-variate machine learning model can be trained to predict anomalies within an IT infrastructure environment for a particular configuration item type. In some embodiments, the model, such as the univariate model, is also trained to reconstruct its provided input. The reconstructed input can be provided along with prediction results to a corresponding multi-variate machine learning model to classify the prediction results of a univariate machine learning anomaly detector. In some embodiments, the process of FIG. 6 is performed at 503, 505, and/or 507 of FIG. 5 by a cloud anomaly detection service. In some embodiments, the cloud anomaly detection service is cloud anomaly detection service 121 of FIG. 1, cloud anomaly detection service 221 of FIG. 2, and/or cloud anomaly detection service 300 of FIG. 3. In some embodiments, once trained, the univariate machine learning models are associated with and deployed to an internal server such as internal server 113 of FIG. 1 and/or internal server 211 of FIG. 2 and/or the multi-variate machine learning models are associated and utilized by the cloud anomaly detection service. In some embodiments, the trained models are stored on a cloud data store such as data store 321 of FIG. 3.

At 601, potential metrics for anomaly prediction are received. For example, metrics collected by monitoring an IT infrastructure using monitoring agents and/or an internal server are identified and received by the cloud anomaly detection service. In some embodiments, a specification of the metrics is received. In various embodiments, the metrics and corresponding data correspond to potential features and training data that can be potentially utilized to train a machine learning model for predicting anomalies.

At 603, data profiling is performed. For example, the data received and/or specified at 601 is evaluated based on its determined profile. In some embodiments, the profiling step is performed to determine which types of data are likely to be useful in training the machine learning model. For example, potential training data can be evaluated to determine whether the values associated with a particular metric are constant and/or have characteristics associated with useful training data. Metrics with constant (or stationary) values can be excluded from the training dataset. In some embodiments, the profiling step can apply one or more configured filters and/or checks to evaluate a metric to determine whether the metric will be a useful feature to train on. Data that meets the profile for useful training data can be passed to preprocessing step 605. In some embodiments, the data profiling is performed by data profiling module 303 of FIG. 3.

At 605, data preprocessing is performed. For example, the data identified as potential useful training data based on its profile is preprocessed to prepare the data as training data. In some embodiments, the preprocessing includes converting values between different units, normalizing values, and/or forward filling values for certain features such as in the case of missing values. In some embodiments, the preprocessing step will fill missing older values, for example, with the mean value of the metric or another appropriate value. In some embodiments, the data preprocessing is performed by data preprocessing module 305 of FIG. 3.

At 607, a machine learning model is trained for the anomaly detection. For example, using the training data that has passed through the profiling and preprocessing steps, the prepared training data is used to train a machine learning model for anomaly detection. In various embodiments, due to the large number of input features and the corresponding large amount of input feature data, unsupervised training techniques are applied to train a model such as a univariate (or multi-variate) machine learning model. For example, the number of features for an unsupervised univariate machine learning model can exceed tens, dozens, or hundreds of features. In some embodiments, a trained unsupervised univariate machine learning model includes an auto-encoder that learns the feature data and allows the trained unsupervised univariate machine learning model to reconstruct the input data it is provided. In some embodiments, the unsupervised machine learning model is trained by training module 317 of FIG. 3.

In some embodiments, the models are trained using supervised training techniques. For example, a multi-variate machine learning model can be trained using labeled data prepared from user provided feedback and paired with a corresponding trained unsupervised univariate model. In some embodiments, user feedback on prior anomaly detection results is profiled at 603 and preprocessed at 605 to generate training data for training the supervised multi-variate machine learning model at 607. In some embodiments, the training process performed is a subsequent retraining of the model with additional and/or improved training data. As the model is retrained over time with additional user feedback, the accuracy of the model will generally improve and will result in more accurate prediction results. In various embodiments, the supervised machine learning models are machine learning anomaly classifiers that classify the anomaly prediction results of a corresponding unsupervised machine learning model. Along with an anomaly prediction result or classification result, the output of the supervised machine learning anomaly classifier can include an anomaly severity such as whether a predicted anomaly is a minor, major, or severe anomaly. Other measurements of the severity of a predicted anomaly such as a ranking or rating can used as well.

In various embodiments, the training performed at 607 includes determining one or more threshold values. For example, a trained machine learning model can include an identified threshold value required to trigger a predicted anomaly or classify an anomaly as a certain severity. In some embodiments, the machine learning model is trained to predict an anomaly score and the determined threshold value corresponds to the minimum predicted anomaly score required to infer a predicted anomaly. In some embodiments, the model is further configured with one or more configurations and/or operating values. For example, the machine learning model can be configured to predict an expected number of anomalies for a specified time period. In the event the predicted number of anomalies is outside the configured expected range (e.g., either less than or greater than), the model may be selected for retraining (or recalibration) in order to conform to the configured operating parameters.

Figure 7:
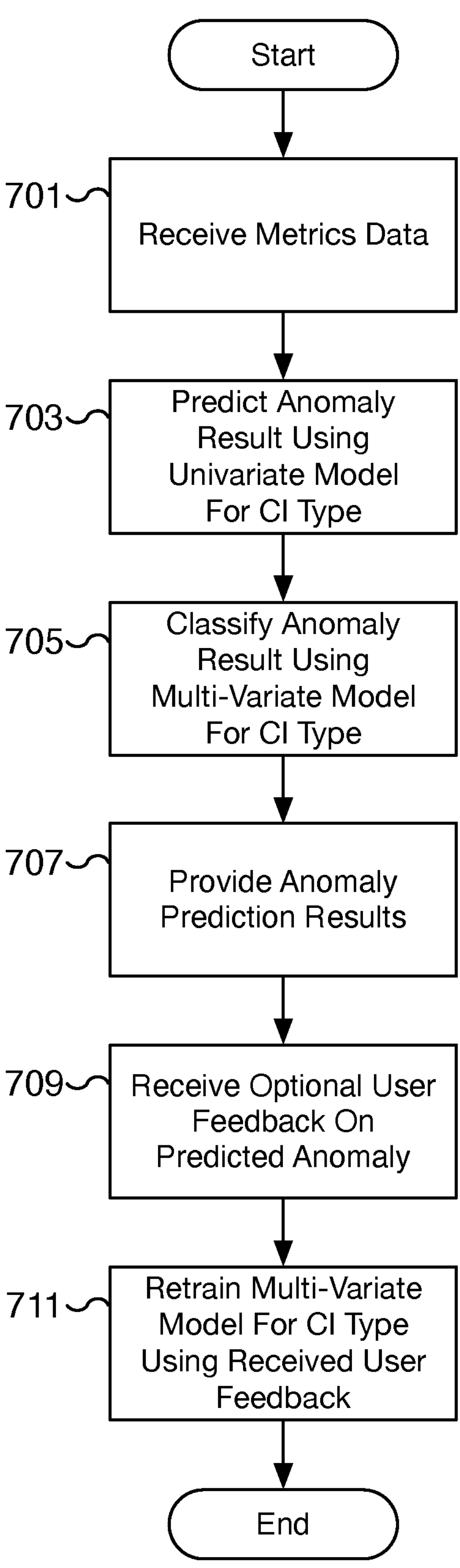
FIG. 7 is a flow chart illustrating an embodiment of a process for detecting an anomaly using a multi-tier anomaly detection system.

FIG. 7 is a flow chart illustrating an embodiment of a process for detecting an anomaly using a multi-tier anomaly detection system. For example, using the process of FIG. 7, a cloud anomaly detection service can predict anomalies by utilizing a first tier univariate machine learning anomaly detector and a second tier multi-variate machine learning anomaly detector. Moreover, corresponding models can be improved and retrained by collecting user feedback on the anomaly detection results. In some embodiments, the process of FIG. 7 is performed at 409 of FIG. 4 by a multi-tier anomaly detection system that includes a cloud anomaly detection service, one or more internal servers, and/or one or more monitoring agents. In some embodiments, the cloud anomaly detection service is cloud anomaly detection service 121 of FIG. 1, cloud anomaly detection service 221 of FIG. 2, and/or cloud anomaly detection service 300 of FIG. 3, an example internal server is internal server 113 of FIG. 1 and/or internal server 211 of FIG. 2, and/or an example monitoring agent is monitoring agent 203 of FIG. 2.

At 701, metrics data is received. For example, metrics data collected by monitoring an IT infrastructure is received. The monitored data can be collected in real time and provided to the cloud anomaly detection service. In various embodiments, the metrics correspond to configuration and/or operating data of the IT infrastructure, its devices, and its configuration items. Example metrics data that can be collected and received at 701 includes but is not limited to metrics related to network utilization, the number of incoming packets per second, the number of outgoing packets per second, device CPU speeds, device CPU temperatures, device memory usages, device swap sizes, and the number of running processes, among others. In various embodiments, the metrics data corresponds to the input features utilized for predicting anomaly results. In some embodiments, the received metrics data can be preprocessed prior to using the data for inference. For example, missing values, values resulting from misconfiguration, and/or any other values that correspond to improperly collected metrics may be addressed by preprocessing the metrics data.

At 703, an anomaly result is predicted using a univariate machine learning model for a specific configuration item type. For example, the metrics data received at 701 is used as input feature data for predicting an anomaly by applying a specific univariate machine learning model matching the configuration item type of a monitored configuration item. An example predicted anomaly can correspond to an expected application failure associated with a surge in swap memory size, limited free memory, and local storage space running low for a server. In various embodiments, the machine learning prediction uses a trained unsupervised machine learning model. The machine learning model can also reconstruct the provided input and include the reconstructed input along with a predicted anomaly result. In some embodiments, the reconstructed input outputted by the univariate machine learning anomaly detector corresponds to the input used to infer the predicted anomaly result.

At 705, the anomaly result is classified using a multi-variate machine learning model for a specific configuration item type. For example, the anomaly result predicted by the univariate machine learning anomaly model at 703 is applied as an input to a multi-variate machine learning model of the same configuration item type. The multi-variate machine learning anomaly model can correspond to an anomaly classifier that classifies the predicted potential anomaly from step 703 to determine a classified anomaly result. In various embodiments, the multi-variate machine learning model utilizes a trained supervised machine learning model. Along with the prediction result of the univariate machine learning model, the multi-variate machine learning model can also receive as input the corresponding input used by the univariate machine learning model. In some embodiments, the input data received by the multi-variate machine learning model is a reconstructed version of the input. In various embodiments, the multi-variate machine learning model functions as an expert sub-model to improve the anomaly results by applying a second machine model that is a trained supervised multi-variate machine learning model. The supervised machine learning model can be trained with feedback provided from users based on previous anomaly prediction results. The outputted anomaly result can be a classified result and can correspond to one or multiple anomaly prediction result values including no anomaly, a minor anomaly, a severe anomaly, and/or a critical anomaly, among others. Other rankings, scales, and/or measurements for an anomaly can be utilized for a classified anomaly result as well.

At 707, anomaly prediction results are provided. For example, the results from the anomaly detection performed by the multi-variate machine learning model at 705 are provided to a user. In some embodiments, the results can correspond exactly to the results of the univariate machine learning model prediction at 703, such as when the multi-variate machine learning anomaly model applied at 705 has not been trained with sufficient training data collected from optional user feedback. In various embodiments, the results can be provided to the user via an interactive user interface dashboard. The provided results can include the metrics that contributed to the results (such as which metrics likely resulting in a detected anomaly) and/or the current maturity and/or change in maturity of the model(s). In various embodiments, the results are provided to a client that can access the results from the anomaly detection service via a network application such as a web browser.

At 709, optional user feedback is received on the predicted anomaly. For example, the user can provide feedback on the anomaly prediction results provided at 707. In various embodiments, the feedback can be received via an interactive user interface dashboard. For example, a user can specify that the anomaly results are not useful or are useful via a user dialog. In some embodiments, users can rank the usefulness of the results. In some embodiments, users can specify whether a predicted anomaly is a true positive or a false positive and/or provide a severity score for a predicted anomaly. For example, in various embodiments, a user can specify that a predicted anomaly is not an anomaly, is a minor anomaly, is a severe anomaly, or is a critical anomaly.

In various embodiments, a user can provide additional feedback on the metrics impacting the anomaly prediction results. For example, a user can specify that a metric should or should not be considered and/or how heavily the metric should have been considered. In some embodiments, the user can provide responses in a natural language format and/or select responses from prepopulated options. In various embodiments, the provided user feedback is optional feedback and is used to retrain the multi-variate machine learning model used as a second tier for anomaly detection.

At 711, the multi-variate machine learning model is retrained using the received user feedback. For example, the user feedback received at 709 is used to retrain the multi-variate machine learning model. In some embodiments, the user feedback is preprocessed, for example, as label data, for supervised training of the machine learning model. A supervised machine learning model can be rapidly retrained and can be retrained frequently, such as daily. Other intervals (or triggers) for training can be more or less frequent but in general the supervised machine learning model will be trained more frequently than the univariate machine learning model used at 703. In some embodiments, the result from retraining is measured, for example, by one or more loss calculations. The retraining measurements can be used to determine a maturity for the model (such as a maturity and/or feedback score) and/or to provide feedback to quantify the amount the supervised model has improved as a result of user provided feedback.

Figure 8:
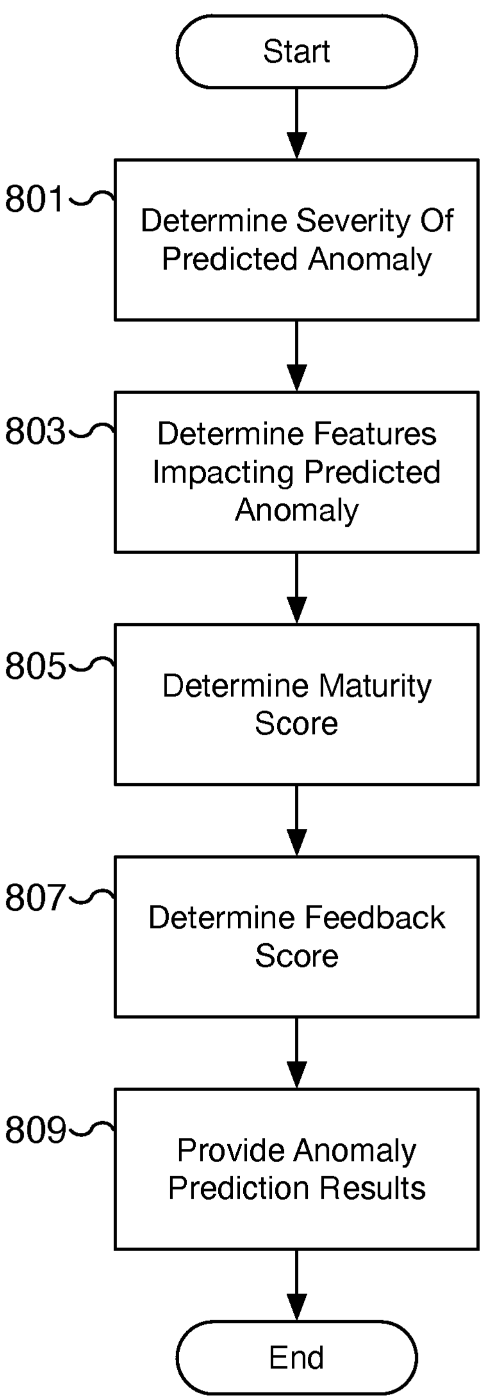
FIG. 8 is a flow chart illustrating an embodiment of a process for providing anomaly detection results using a multi-tier anomaly detection system.

FIG. 8 is a flow chart illustrating an embodiment of a process for providing anomaly detection results using a multi-tier anomaly detection system. For example, using the process of FIG. 8, a cloud anomaly detection service can provide anomaly prediction results and associated data to encourage users to submit optional feedback on the results. The collected feedback can be used to retrain the machine learning models used for the anomaly detection process in order to improve the detection of future anomalies. In some embodiments, the process of FIG. 8 is performed at 409 of FIG. 4 and/or at 703, 705, and/or 707 of FIG. 7 by a cloud anomaly detection service. In some embodiments, the cloud anomaly detection service is cloud anomaly detection service 121 of FIG. 1, cloud anomaly detection service 221 of FIG. 2, and/or cloud anomaly detection service 300 of FIG. 3.

At 801, the severity of the predicted anomaly is determined. In various embodiments, the severity of a predicted anomaly is determined based on a classification result by performing inference using a multi-variate machine learning anomaly classifier. For example, based on a classification result from applying a multi-variate machine learning model to the prediction result of a univariate machine learning model, the predicted anomaly is classified and mapped to one of multiple severities. In some embodiments, the severity is a discrete value that is mapped to descriptions such as no anomaly, minor anomaly, severe anomaly, or critical anomaly. In some embodiments, the severity corresponds to a severity score such as a value between 0.0 and 1.0, a value from 0 to 10, or another appropriate range of severity values.

At 803, the features impacting the predicted anomaly are determined. For example, the metrics used to predict an anomaly are evaluated and interpreted to determine which ones impacted the anomaly prediction and by how much. For example, the input features can be assigned a percentage value out of 100% based on the percentage of impact each feature has on the anomaly prediction with the most impactful features having the highest percentages. In some embodiments, the impact that features have on the prediction results are determined by an interpretability module such as interpretability module 315 of FIG. 3. In some embodiments, only the most impactful features are tracked and provided to the user. For example, the top 8 (or top 5 or top 10) most impactful features can be tracked and provided to the user. In some embodiments, only features that meet a minimum amount of impact are tracked and provided to the user. For example, only features that impact a prediction result by a threshold value (such as 5%) are provided to the user.

At 805, a maturity score is determined. For example, the maturity of the cloud anomaly detection service and its corresponding models are determined for each configuration item type. In some embodiments, the maturity corresponds to the maturity of the multi-variate machine learning model for the configuration item type. In some embodiments, the maturity corresponds to the maturity of the combination of the univariate machine learning model and multi-variate machine learning model for the configuration item type. In various embodiments, the maturity can be evaluated using a maturity score. For example, one or more loss calculations can be evaluated to determine a loss calculation result for a version of a trained machine learning model. The average of the last set of loss calculations can be used as a basis for evaluating the improvement in the model between trainings. For example, a running average of loss calculation results from past epochs can be calculated and used to determine the maturity of the prediction model or models. In some embodiments, the maturity can be determined by converting a logarithmic value, such as a logarithmic loss calculation result, to a linear value.

At 807, a feedback score is determined. For example, a feedback score can be determined to further describe the maturity of the cloud anomaly detection service. In various embodiments, the feedback score corresponds to the amount of improvement made in the multi-variate machine learning model by retraining the model using newly provided user feedback. For example, a model can be retrained once new user feedback is provided. A new feedback score can then be determined by evaluating the difference in maturity between past versions of the model and the newly trained model that is trained on data that includes the most recent user feedback. In various embodiments, the feedback score corresponds to improvements in loss calculation results. For example, feedback score can be presented as an improvement percentage value such as the percentage of improvement compared to a previous model. In some embodiments, the improvement is presented not as a change relative to past or current models but as a change in the maturity score relative to a completely mature model (e.g., a model with a hypothetical maturity score of 100%).

At 809, the anomaly prediction results are provided. For example, anomaly prediction results that include the severity of the anomaly, the features impacting the prediction anomaly, and maturity and feedback scores are provided to the user. In some embodiments, the prediction results and corresponding data are provided via an interactive user interface dashboard. For example, the provided features impacting the prediction anomaly can be shown in ranked order along with their corresponding contribution values and their neighboring values in time (i.e., past and future values relative to the timing of the anomaly prediction). In some embodiments, the maturity and feedback scores are provided at least in part to incentivize the user to provide additional user feedback on prediction results. For example, by showing a maturing model with a higher maturity score in response to each provided collection of user feedback, the user is encouraged to continue providing user feedback in order to continue to advance the maturity of the model. In various embodiments, as user feedback is provided, the model is retrained and the corresponding newest maturity and feedback scores associated with the recently provided user feedback are determined and provided.

Figure 9:
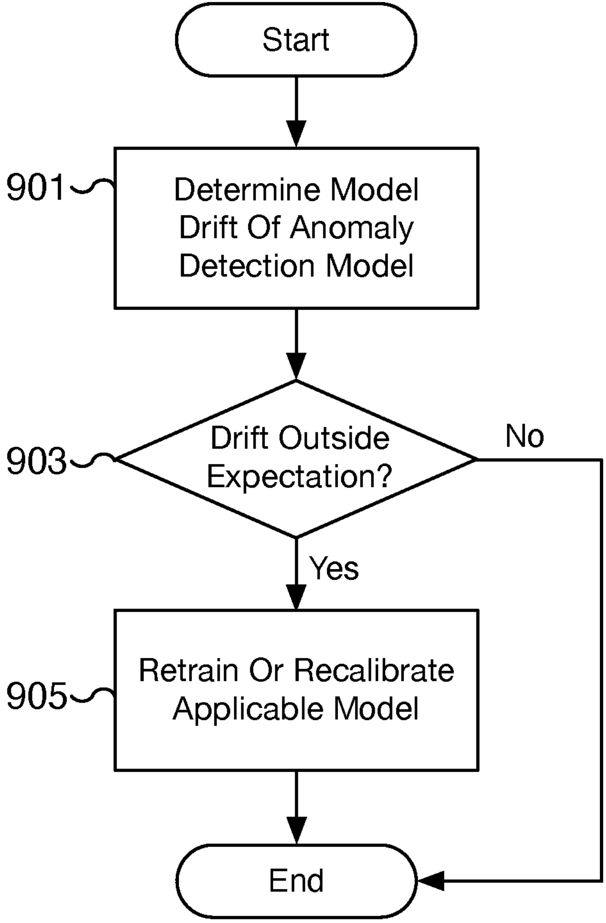
FIG. 9 is a flow chart illustrating an embodiment of a process for initiating the retraining of a machine learning model.

FIG. 9 is a flow chart illustrating an embodiment of a process for initiating the retraining of a machine learning model. For example, using the process of FIG. 9, one or more machine learning models used by a cloud anomaly detection service can be retrained when their predicted results are no longer consistent with their configured expected results. For example, when the drift experienced by a model exceeds a configured threshold, the model can be provided with new configuration expectations and retrained and/or recalibrated. In some embodiments, the process of FIG. 9 is performed in parallel to the anomaly detection process at configured times and/or intervals and/or on demand. For example, a trained machine learning model can be reevaluated for concept drift once a day, week, month, at another set time interval, and/or at request. Although the process of FIG. 9 is described with respect to trained univariate machine learning models, the process can also apply to trained multi-variate machine learning models. In some embodiments, the cloud anomaly detection service is cloud anomaly detection service 121 of FIG. 1, cloud anomaly detection service 221 of FIG. 2, and/or cloud anomaly detection service 300 of FIG. 3. In some embodiments, the models that may require retraining include the univariate machine learning models associated with and deployed to an internal server such as internal server 113 of FIG. 1 and/or internal server 211 of FIG. 2 and/or the multi-variate machine learning models are associated and utilized by the cloud anomaly detection service. In some embodiments, the retrained models are stored on a cloud data store such as data store 321 of FIG. 3.

At 901, the model drift of an anomaly detection model is determined. For example, the cloud anomaly detection service can be evaluated to determine the amount of concept drift associated with its models and in particular with a machine learning model used by a machine learning anomaly detector such as a univariate (or multi-variate) machine learning anomaly detector. In various embodiments, the model drift can be evaluated using one or more different determined metrics (each with a potential different corresponding threshold value). Model drift can be associated with changes in the operation or behavior of the anomaly detection service. For example, factors such as the number of active users, the purpose of one or more devices, and/or the distribution of the data, among other factors, may change over time and can impact prediction performance. By evaluating the model(s) for concept drift, the cloud anomaly detection service can recalibrate one or more models to align with their configured and/or expected usage.

In some embodiments, the concept drift is associated with a change in the behavior of the univariate machine learning model, such as the inability for the univariate machine learning model to reconstruct its input for use with the multi-variate machine learning model. In various embodiments, concept drift is associated with model predictions that no longer meet expectations such as sensitivity and/or threshold configurations. For example, the anomaly detection service can be configured to detect a certain number of anomalies for a given time period. Over time, the service may exceed or fall short of the expected number of detected anomalies.

At 903, a determination is made whether the determined concept drift metrics are outside expected threshold values. For example, the determined concept drift metrics can exceed or fall short of one or more configured threshold values indicating the models and in particular the univariate machine learning model has drifted outside it's intended and desired concept goals. In the event the concept drift determined for a univariate machine learning anomaly detector is outside configured threshold values, processing proceeds to step 905 where the corresponding univariate machine learning model is retrained. In the event the concept drift determined for the univariate machine learning anomaly detector is within configured threshold values, processing completes and no retraining is required. In some embodiments, the identification of a single concept drift metric outside its threshold value can trigger retraining at 905. In some embodiments, every concept drift metric must be outside its corresponding threshold value to trigger retraining at 905.

At 905, the applicable machine learning model is retrained or recalibrated. For example, the univariate machine learning model used by a univariate machine learning anomaly detector is retrained and/or recalibrated. In various embodiments, the retraining and/or recalibration is based on configured sensitivity and/or threshold values. In some embodiments, the retraining may utilize the existing model and only newly collected data, such as data within a new data collection window, is used for retraining. In various embodiments, the retraining may further apply different weights to different types of data, such as applying greater weight to more recent data. Once the univariate machine learning model is retrained, it can be deployed for use with a univariate machine learning anomaly detector. In some embodiments, a corresponding model such as the multi-variate model corresponding to the univariate model is retrained and/or recalibrated as well.

Figure 10:
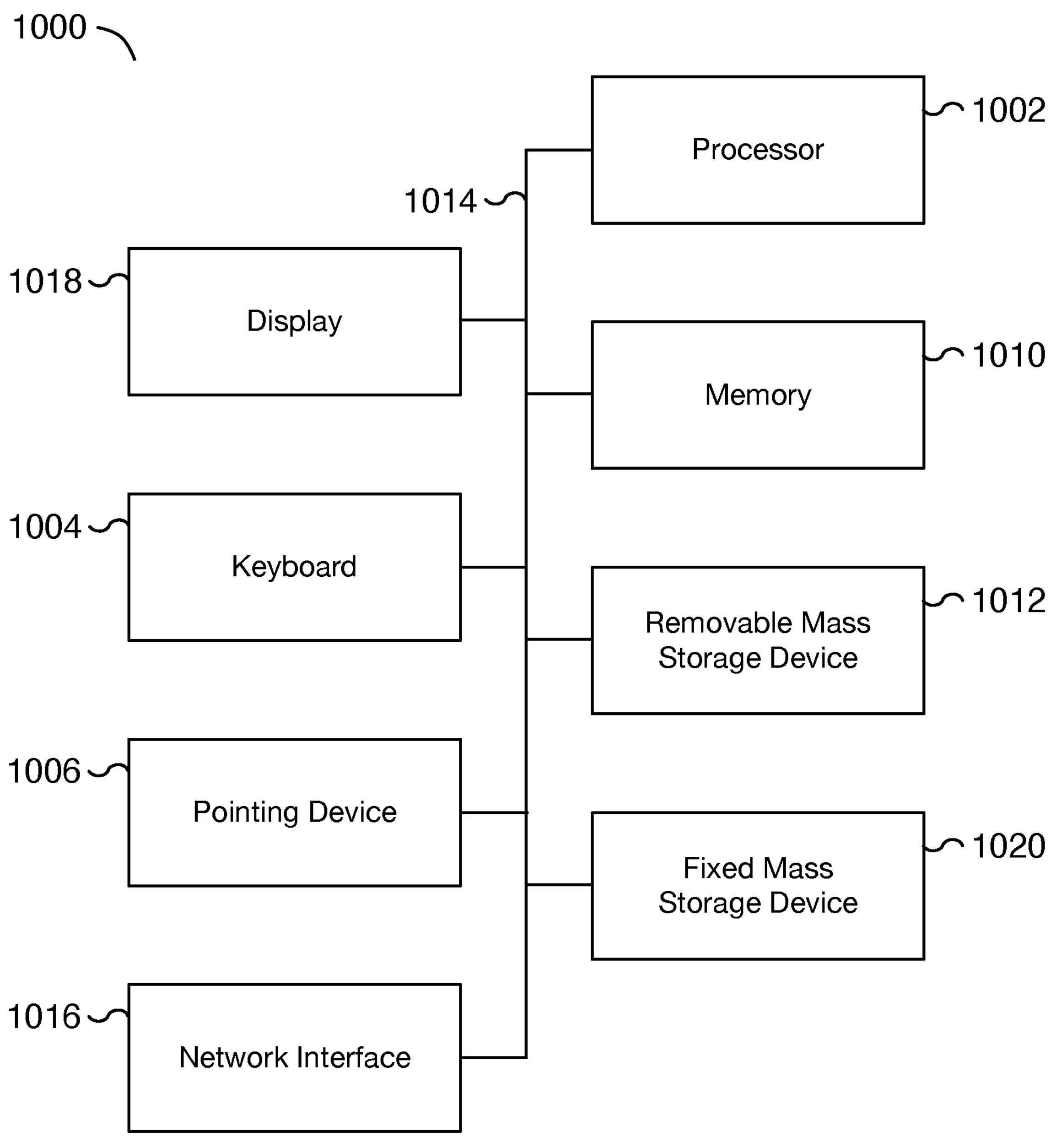
FIG. 10 is a functional diagram illustrating a programmed computer system for a multi-tier anomaly detection system.

FIG. 10 is a functional diagram illustrating a programmed computer system for a multi-tier anomaly detection system. As will be apparent, other computer system architectures and configurations can be utilized for performing anomaly detection using a multi-tier anomaly detection system including those with one or more graphical processing units (GPUs). Examples of computer system 1000 include client 101 of FIG. 1, one or more computers of cloud anomaly detection service 121 of FIG. 1, one or more devices/servers of customer network environment 111 of FIG. 1 including devices 114, 115, 116, and/or 117 of FIG. 1 and/or internal server 113 of FIG. 1, one or more computers of multi-tier anomaly detection system 200 of FIG. 2, device 201 of FIG. 2, internal server 211 of FIG. 2, one or more computers of cloud anomaly detection service 221 of FIG. 2, one or more computers of cloud anomaly detection service 300 of FIG. 3, one or more computers of anomaly detection application server 301 of FIG. 3, and/or one or more computers of data store 321 of FIG. 3. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018). In various embodiments, one or more instances of computer system 1000 can be used to implement at least portions of the processes of FIGS. 4-9.

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data and objects used by the processor 1002 to perform its functions (e.g., programmed instructions). For example, memory 1010 can include any suitable computer-readable storage media, described below, depending on whether, for example, data access needs to be bi-directional or unidirectional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or unidirectionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storages 1012, 1020 generally store additional programming instructions, data, and the like that typically are not in active use by the processor 1002. It will be appreciated that the information retained within mass storages 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

for each respective configuration item type of a plurality of different configuration item types, training a corresponding multi-variate machine learning model of a plurality of multi-variate machine learning models to perform anomaly detection for the respective configuration item type;

detecting, using a univariate machine learning model, an anomaly associated with a specific configuration item type of the plurality of different configuration item types;

in response to detecting the anomaly using the univariate machine learning model, executing the multi-variate machine learning model of the plurality of multi-variate machine learning models that corresponds to the specific configuration item type; and determining an enhanced anomaly detection result based on an output of the multi-variate machine learning model that corresponds to the specific configuration item type.

2. The method of claim 1, wherein the univariate machine learning model is a stationary statistical model.

3. The method of claim 1, wherein the multi-variate machine learning model that corresponds to the specific configuration item type is a time-series based model.

4. The method of claim 1, wherein the enhanced anomaly detection result is associated with a remote device, and wherein the remote device is assigned the specific configuration item type of the plurality of different configuration item types.

5. The method of claim 4, wherein data used to detect the anomaly, via the univariate machine learning model, is collected by an agent at the remote device.

6. The method of claim 1, wherein the univariate machine learning model is trained to reconstruct an input provided to the univariate machine learning model, and wherein the multi-variate machine learning model that corresponds to the specific configuration item type is executed using the reconstructed input as one or more inputs.

7. The method of claim 1, further comprising:

retraining the multi-variate machine learning model that corresponds to the specific configuration item type to generate an updated version of the multi-variate machine learning model that corresponds to the specific configuration item type, wherein the multi-variate machine learning model that corresponds to the specific configuration item type is retrained using an output from the univariate machine learning model and an anomaly detection feedback associated with the anomaly detection result.

8. The method of claim 7, wherein the anomaly detection feedback includes one or more features identified by a user as contributing to the enhanced anomaly detection result.

9. The method of claim 1, further comprising:

providing an agent for monitoring metrics of a device assigned the specific configuration item type of the plurality of different configuration item types.

10. The method of claim 9, further comprising:

activating a communication channel with a server in communication with the device, wherein the server is configured to apply the univariate machine learning model using collected metrics data to detect the anomaly.

11. The method of claim 10, wherein the univariate machine learning model is configured to detect the anomaly based on one or more of the collected metrics data exceeding one or more configured threshold values.

12. A system comprising:

one or more processors; and a memory coupled to the one or more processors, wherein the memory is configured to provide the one or more processors with instructions which when executed cause the one or more processors to:

for each respective configuration item type of a plurality of different configuration item types, train a corresponding multi-variate machine learning model of a plurality of multi-variate machine learning models to perform anomaly detection for the respective configuration item type;

detect, using a univariate machine learning model, an anomaly associated with a specific configuration item type of the plurality of different configuration item types;

in response to detecting the anomaly using the univariate machine learning model, execute the multi-variate machine learning model of the plurality of multi-variate machine learning models that corresponds to the specific configuration item type; and determine an enhanced anomaly detection result based on an output of the multi-variate machine learning model that corresponds to the specific configuration item type.

13. The system of claim 12, wherein the univariate machine learning model is a stationary statistical model.

14. The system of claim 12, wherein the multi-variate machine learning model that corresponds to the specific configuration item type is a time-series based model.

15. The system of claim 12, wherein the enhanced anomaly detection result is associated with a remote device, and wherein the remote device is assigned the specific configuration item type of the plurality of different configuration item types.

16. The system of claim 15, wherein data used to detect the anomaly, via the univariate machine learning model, is collected by an agent at the remote device.

17. The system of claim 12, wherein the memory is further configured to provide the one or more processors with instructions which when executed cause the one or more processors to:

provide an agent for monitoring metrics of a device assigned the specific configuration item type of the plurality of different configuration item types.

18. The system of claim 17, wherein the memory is further configured to provide the one or more processors with instructions which when executed cause the one or more processors to:

activate a communication channel with a server in communication with the device, wherein the server is configured to apply the univariate machine learning model using collected metrics data to detect the anomaly.

19. The system of claim 18, wherein the univariate machine learning model is configured to detect the anomaly based on one or more of the collected metrics data exceeding one or more configured threshold values.

20. A computer program product, the computer program product being embodied in a non-transitory computer readable storage medium and comprising computer instructions for:

for each respective configuration item type of a plurality of different configuration item types, training a corresponding multi-variate machine learning model of a plurality of multi-variate machine learning models to perform anomaly detection for the respective configuration item type;

detecting, using a univariate machine learning model, an anomaly associated with a specific configuration item type of the plurality of different configuration item types;

in response to detecting the anomaly using the univariate machine learning model, executing the multi-variate machine learning model of the plurality of multi-variate machine learning models that corresponds to the specific configuration item type; and determining an enhanced anomaly detection result based on an output of the multi-variate machine learning model that corresponds to the specific configuration item type.

* * * * *